US012544899B2

(12) United States Patent
Harris

(10) Patent No.: US 12,544,899 B2
(45) Date of Patent: Feb. 10, 2026

(54) DRUM KEY MULTI-TOOL

(71) Applicant: Norman Bryan Harris, Nashville, TN (US)

(72) Inventor: Norman Bryan Harris, Nashville, TN (US)

( * ) Notice: Subject to any disclaimer, the term of this patent is extended or adjusted under 35 U.S.C. 154(b) by 302 days.

(21) Appl. No.: 18/304,015

(22) Filed: Apr. 20, 2023

(65) Prior Publication Data

US 2023/0339090 A1 Oct. 26, 2023

Related U.S. Application Data

(60) Provisional application No. 63/363,496, filed on Apr. 25, 2022.

(51) Int. Cl.
*B25F 1/00* (2006.01)
*G10D 13/16* (2020.01)

(52) U.S. Cl.
CPC ............... *B25F 1/00* (2013.01); *G10D 13/16* (2020.02)

(58) Field of Classification Search
CPC .... B25F 1/00; B25F 1/04; B25F 1/003; B25F 1/006; G10D 13/16
USPC ............................................. 7/164, 165, 151
See application file for complete search history.

(56) References Cited

U.S. PATENT DOCUMENTS

D42,368 S * 3/1912 Mossberg ........................ D8/18
D53,352 S * 5/1919 Brace ............................. D28/59
D197,915 S * 4/1964 Ayars .............................. 81/439
D278,509 S * 4/1985 Middleton ........................ D8/18
6,003,181 A 12/1999 Wenk
D434,622 S * 12/2000 Jaynes ............................. D8/17
6,347,875 B1 2/2002 Painsith
7,036,174 B2 5/2006 Painsith et al.
7,351,900 B2 4/2008 May
8,713,735 B1 5/2014 Pelton
9,003,665 B2 4/2015 Pelton
9,815,212 B2 11/2017 Barr
9,895,795 B2 2/2018 Nix et al.
D824,800 S 8/2018 Blume
10,112,293 B2 10/2018 Cheng
10,611,012 B2 4/2020 Adelman et al.
10,643,588 B1 5/2020 Doherty
10,765,893 B2 9/2020 Drai
10,772,338 B2 9/2020 Blondell
D897,813 S 10/2020 Parks
2012/0317819 A1* 12/2012 Pelton ........................ B26B 9/02 30/142

(Continued)

*Primary Examiner* — Hadi Shakeri
(74) *Attorney, Agent, or Firm* — Dunlap Bennett & Ludwig PLLC; Anna L. Kinney

(57) ABSTRACT

A multi-tool comprises a substantially triangular body having a first corner, a second corner, a third corner, and a straight edge, with a first and a second substantially planar surface; a first aperture formed therein, offset from a center of the substantially triangular body, having a perimeter with a rounded segment from which protrudes a tooth; a flat head screwdriver tip protruding from the first corner; a second aperture formed in the second corner; and a third aperture in the third corner, having a square perimeter. The multi-tool may be kept in a wallet. This greatly reduces the chance of a drummer being stranded without a drum key and other tools necessary in the maintenance and tuning of drum sets. Advantageously, the drum key is portable, durable, and multifunctional.

5 Claims, 2 Drawing Sheets

(56) References Cited

U.S. PATENT DOCUMENTS

| | | | |
|---|---|---|---|
| 2013/0112064 | A1 | 5/2013 | Ginter |
| 2016/0176034 | A1 | 6/2016 | Barr |
| 2017/0043467 | A1 | 2/2017 | Arakelian |

* cited by examiner

DRUM KEY MULTI-TOOL

CROSS-REFERENCE TO RELATED APPLICATION

This application claims the benefit of priority of U.S. provisional application No. 63/363,496, filed Apr. 25, 2022, the contents of which are herein incorporated by reference.

BACKGROUND OF THE INVENTION

The present invention relates to multi-tools and, more particularly, to a drum key multi-tool.

A drum key is an important tool for a drummer to control the pitch of his/her drums. Currently available drum keys often have an odd size and are not easily or conveniently stored or transported. As a result, they are often forgotten, misplaced, or lost. If a drummer forgets his/her drum key, drums cannot be tuned properly. Moreover, prior art drum keys generally break or warp over time.

As can be seen, there is a need for a conveniently sized and storable drum key that can be easily located.

SUMMARY OF THE INVENTION

In one aspect of the present invention, a multi-tool comprises a substantially triangular body having a first corner, a second corner, a third corner, and a straight edge, with a first and a second substantially planar surface; a first aperture formed therein, offset from a center of the substantially triangular body, having a perimeter with a rounded segment from which protrudes a tooth; a flat head screwdriver tip protruding from the first corner; a second aperture formed in the second corner; and a third aperture in the third corner, having a square perimeter.

The multi-tool may be kept in a wallet. This greatly reduces the chance of a drummer being stranded without a drum key and other tools necessary in the maintenance and tuning of drum sets. Advantageously, the drum key is portable, durable, and multifunctional.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, the term "tooth" refers to a functional projection on a bottle opener tool that may be inserted under the pleated edge of a metal bottle cap.

Broadly, one embodiment of the present invention is a multi-tool comprising a drum key with additional functionality. The drum key may also function as a bottle opener, a ruler, and a flathead screwdriver.

The drum key element is generally configured to optimize torque and to universally tighten all drum lugs.

The bottle opener element is generally formed in the center to ensure leverage and to exhibit angles operative to open bottles.

The screwdriver element has a flathead configuration and is positioned to maximize torque. The screwdriver may be used to tighten flathead screws found throughout commercially available drum sets and within commercially available drum accessories.

The ruler element may be configured to measure inches. For example, the ruler indicia may indicate a length of 2¼ inches in ⅛- or 1⁄16-inch increments. The ruler may be used to measure drumheads.

The keychain hole element is generally positioned to ensure easy access to the remaining elements. The keychain hole may be used to hang the tool from a key ring.

The drum key multi-tool is dimensioned to fit into a commercially available wallet. For example, the multi-tool may have dimensions identical to or similar to a credit card.

The tool may be composed of stainless steel to increase longevity and durability. The tool may be produced using a CMC machine to cut the steel. Alternatively, the tool may be formed in a mold.

Figure 1:
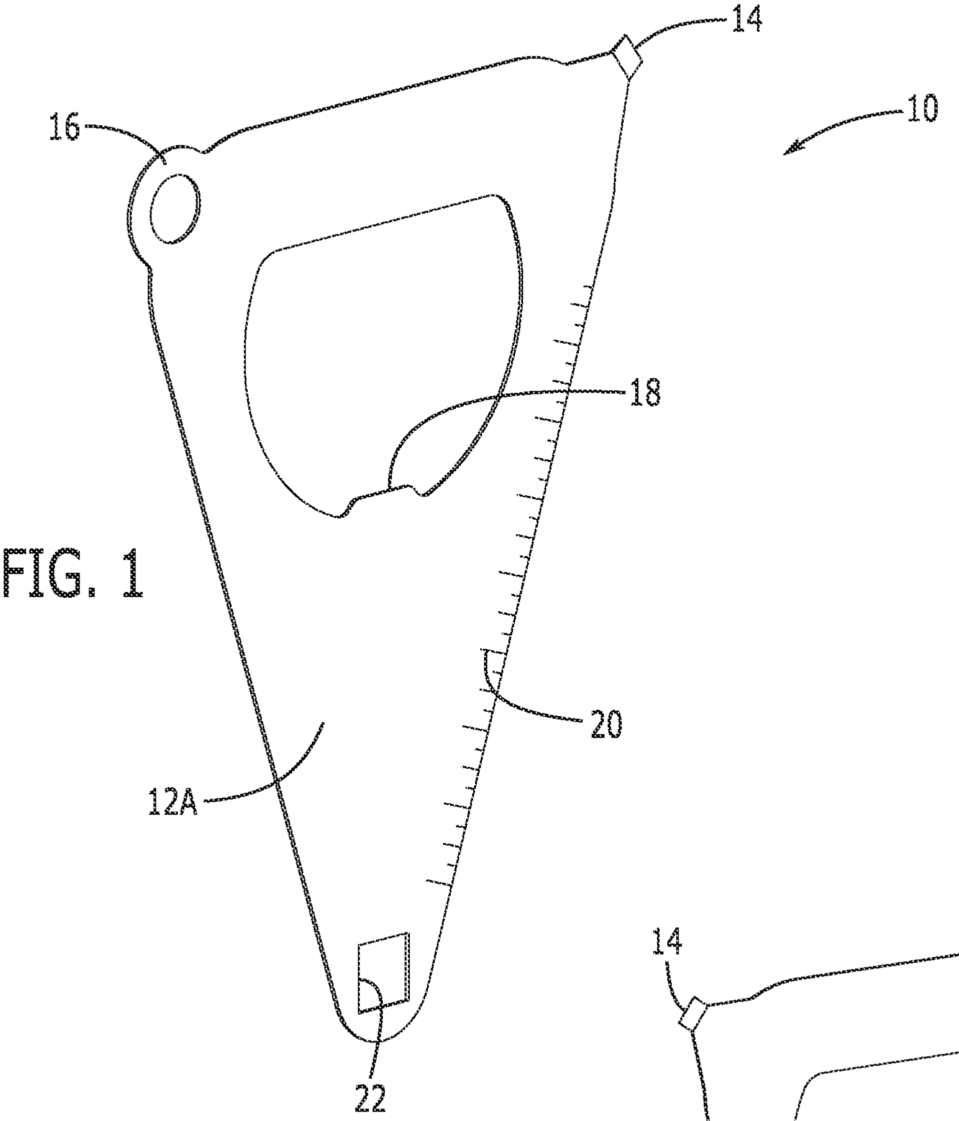
FIG. 1 is a front perspective view of a drum key multi-tool according to an embodiment of the present invention.
Figure 2:
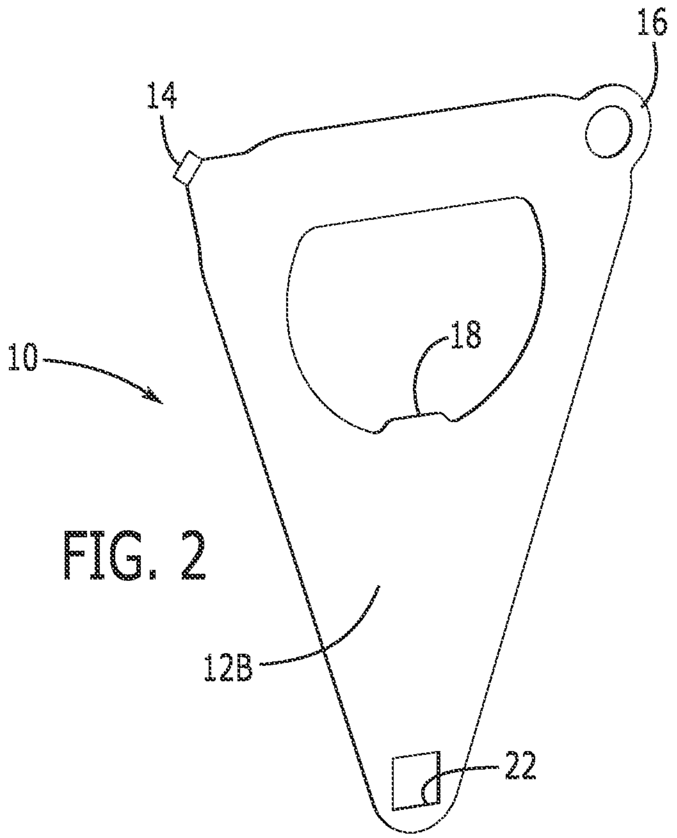
FIG. 2 is a rear perspective view thereof.
Figure 3:
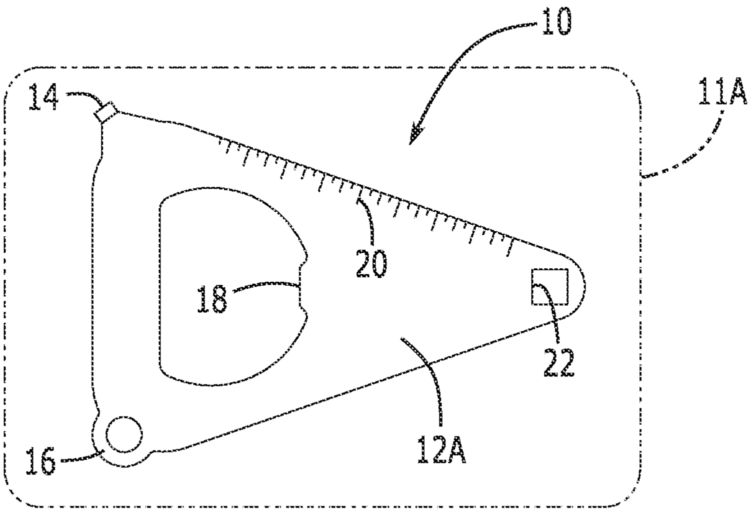
FIG. 3 is a plan view thereof, shown stored in a wallet.
Figure 4:
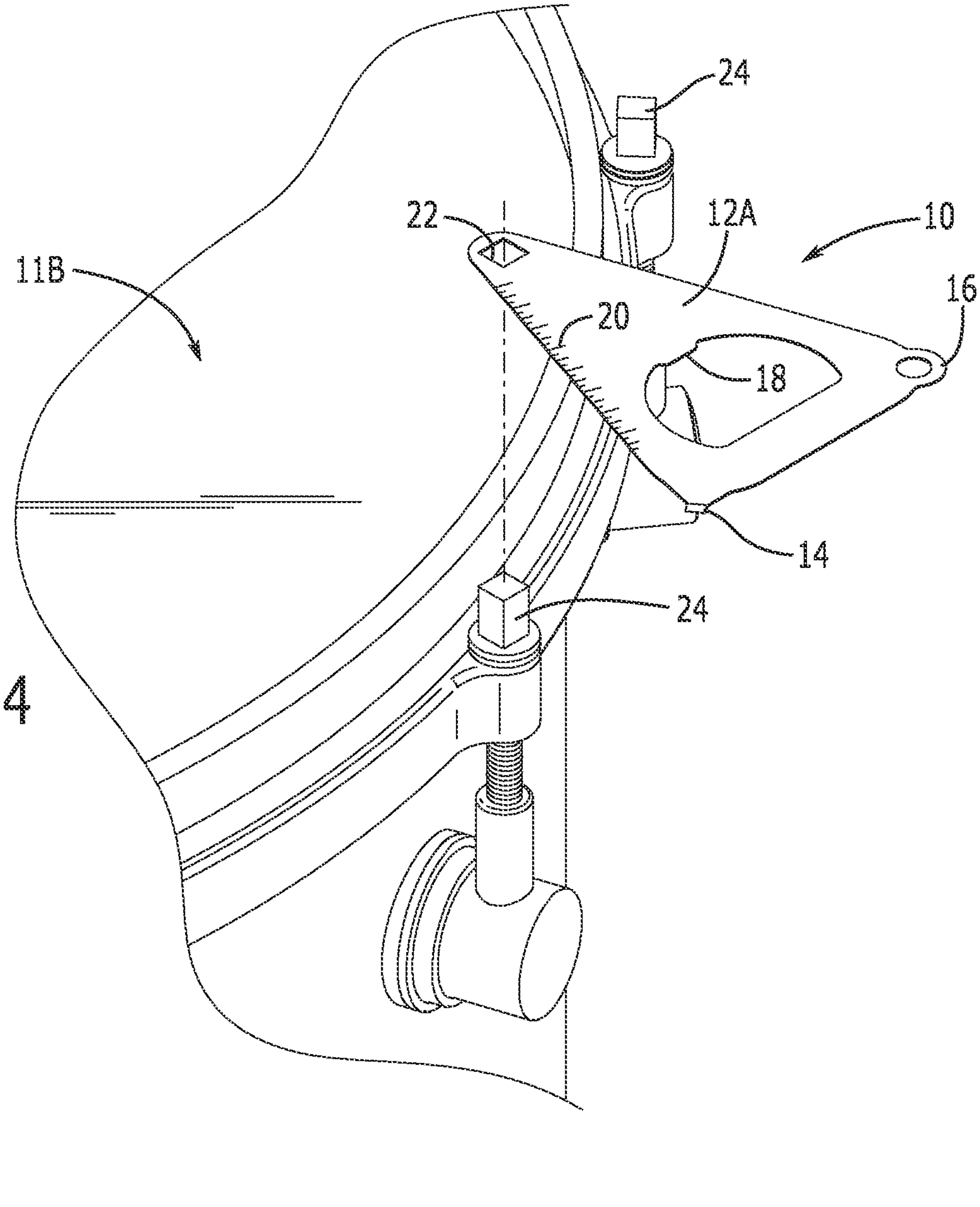
FIG. 4 is an exploded perspective view thereof, shown in use.

Referring to FIGS. 1 through 4, a drum key multi-tool 10 according to an embodiment of the present invention is shown in FIGS. 1 and 2. The drum key 10 has a substantially triangular perimeter with a substantially planar front surface 12A and a substantially planar rear surface 12B. A bottle opener 18 aperture, having a shape that is substantially a circle segment with a tooth protruding into the aperture midway along the rounded edge, is formed through the front and rear surfaces 12A, 12B, offset from the center so that one corner of the tool 10 serves as a lever. A first corner of the triangular perimeter forms a flat head screwdriver tip 14. A second corner of the triangular perimeter has a semicircular edge with an aperture formed adjacent thereto, suitable for use as a keychain ring 16. A third corner of the triangular perimeter has a rounded edge with a square aperture formed adjacent thereto, suitable for use as a tuning wrench slot 22. The tuning wrench slot 22 may be used to tighten a tuning lug 24 on a drum 11B, as shown in FIG. 4. One edge of the drum key 10 has ruler markings 20 on the front surface 12A to serve as a ruler.

As FIG. 3 illustrates, the drum key 10 is sized to fit into a wallet.

It should be understood, of course, that the foregoing relates to exemplary embodiments of the invention and that modifications may be made without departing from the spirit and scope of the invention as set forth in the following claims.

What is claimed is:

1. A drum key multi-tool comprising:

a substantially triangular body having a first corner, a second corner, a third corner, a first edge extending from the first corner to the second corner, a straight edge extending from the first corner to the third corner, and a third edge formed between the second corner and the third corner, with a first and a second substantially planar surface;

a bottle opener aperture formed therein, offset from a center of the substantially triangular body, the bottle opener aperture having a perimeter with a rounded segment from which protrudes a tooth;

a flat head screwdriver tip protruding from the first corner;

a keychain aperture formed in the second corner; and a drum tuning wrench aperture in the third corner, having a square perimeter;

wherein a first recess is formed in the first edge adjacent the first corner and a second recess is formed in the straight edge adjacent the first corner such that the first recess and the second recess provide clearance around the flat head screwdriver tip;

wherein a first notch in the first edge and a second notch in the third edge form a scalloped edge at the second corner;

wherein the straight edge and the third edge converge for form a curved edge at the third corner; and wherein the substantially triangular body is dimensioned to be accommodated within a wallet.

2. The drum key multi-tool of claim 1, wherein the straight edge is a ruler having measurement indicia.

3. The rum key multi-tool of claim 1, wherein the substantially triangular body is unitary and formed of stainless steel.

4. The drum key multi-tool of claim 1, wherein the straight edge is positioned opposite to the second corner.

5. The drum key multi-tool of claim 1, wherein the substantially triangular body is configured as an acute triangle.

* * * * *